United States Patent [19]
Hattori et al.

[11] Patent Number: 4,835,044
[45] Date of Patent: May 30, 1989

[54] CERAMIC HONEYCOMB STRUCTURAL BODIES

[75] Inventors: Isao Hattori, Nagoya; Koichi Ikeshima, Okazaki, both of Japan

[73] Assignee: NGK Insulators, Ltd., Japan

[21] Appl. No.: 161,049

[22] Filed: Feb. 26, 1988

[30] Foreign Application Priority Data

Mar. 14, 1987 [JP] Japan ................................. 62-57911

[51] Int. Cl.4 ............................................. B32B 3/12
[52] U.S. Cl. .................................... 428/116; 156/89; 264/177.2; 428/188; 502/527
[58] Field of Search ................... 156/89; 264/177.12; 428/116, 188; 502/527

[56] References Cited

U.S. PATENT DOCUMENTS

| 3,790,654 | 2/1974 | Bagley | 428/116 X |
| 4,177,307 | 12/1979 | Torll | 428/188 X |
| 4,233,351 | 11/1980 | Okumura et al. | 428/188 X |
| 4,327,188 | 4/1982 | Endo et al. | 428/116 X |
| 4,404,007 | 9/1983 | Tukao et al. | 428/117 X |
| 4,416,676 | 11/1983 | Montierth | 428/116 X |

FOREIGN PATENT DOCUMENTS 0191982 8/1986 European Pat. Off. .
2067915 8/1981 United Kingdom .

OTHER PUBLICATIONS

JP Patent Application No. 54-110189, laid open Aug. 29, 1979.

Primary Examiner—Henry F. Epstein
Attorney, Agent, or Firm—Arnold, White & Durkee

[57] ABSTRACT

A ceramic honeycomb structural body having a plurality of through-holes surrounded by partition walls wherein, the partition wall thickness in at least a central portion of the structural body at a section perpendicular to the through-hole is thinned stepwise from a crossing segment of the partition wall up to a middle segment thereof.

9 Claims, 5 Drawing Sheets

FIG_1
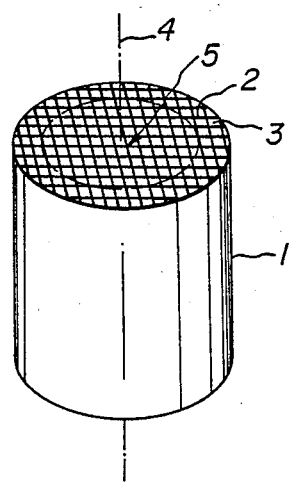
FIG_2
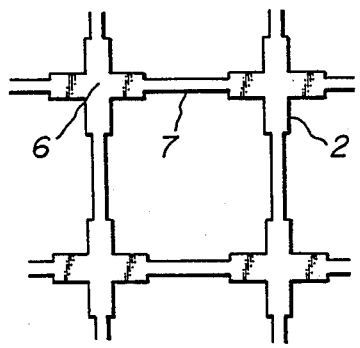

FIG_3a
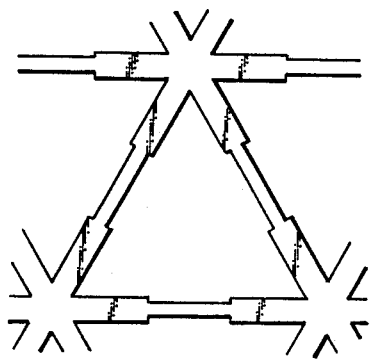
FIG_3b
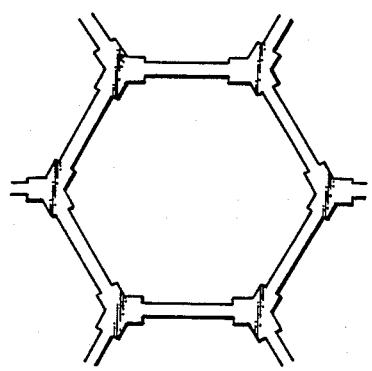

FIG_4
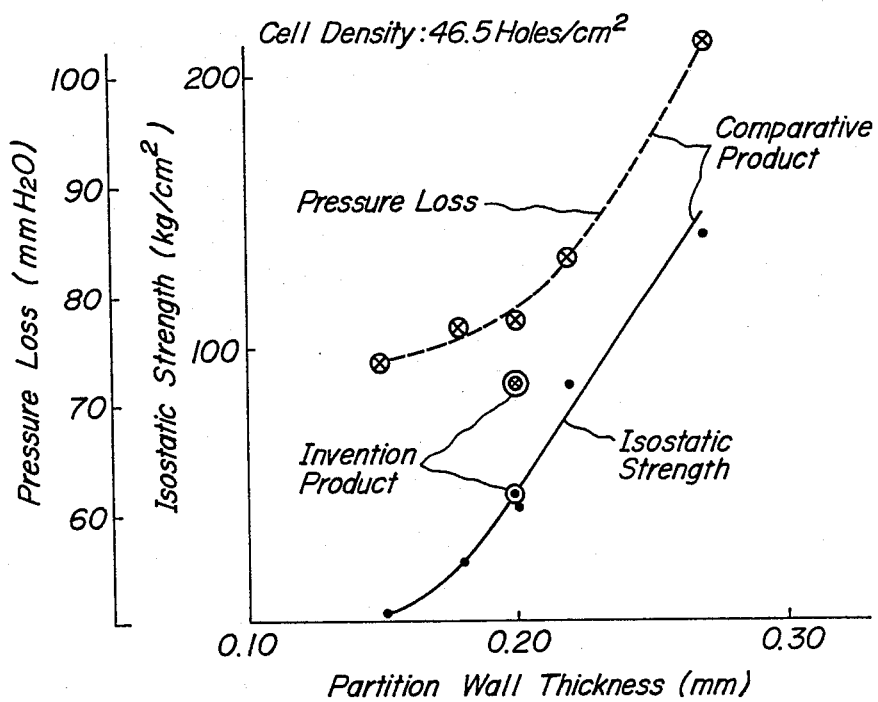

FIG_6
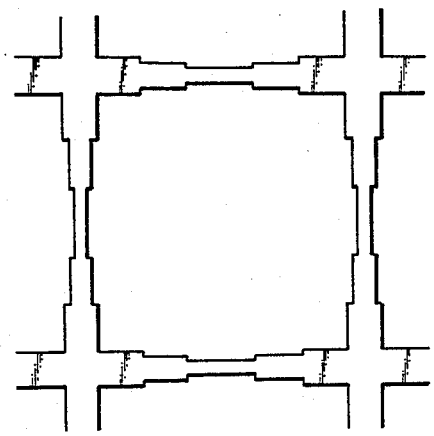
FIG_7
PRIOR ART
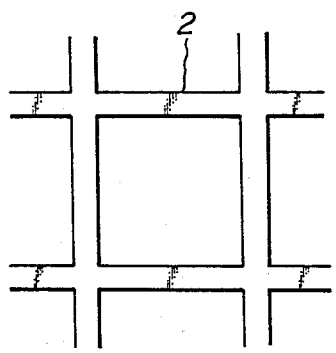

CERAMIC HONEYCOMB STRUCTURAL BODIES

BACKGROUND OF THE INVENTION

1. Field of the Invention

This invention relates to a ceramic honeycomb structural body used as a catalyst carrier for purification of an exhaust gas from an internal combustion engine for automobiles, a filter for purification of fine particles, or a catalyst carrier for purification and/or deodorization of an exhaust gas using various gases or petroleum as a fuel.

2. Related Art Statement

Heretofore, the ceramic honeycomb structural body used as a catalyst carrier is required to mainly satisfy the following two conditions:

(1) the geometric surface area per volume (simply referred to as a surface area hereinafter) of the ceramic honeycomb structural body is increased to improve the purification performance;,and
(2) the pressure loss of combustion gas is decreased to reduce energy required for permeation.

As a method for simultaneously satisfying these two requirements, if it is generally intended to make the cell density of the ceramic honeycomb structural body constant. A method has been proposed wherein the thickness of the partition wall inclusive of its crossing portion is made uniformly thin over the whole of the structural body. Another method has been proposed wherein the thickness of the partition wall is regularly thinned toward a passing center of an exhaust gas as disclosed in Japanese Patent laid open No. 54-110,189.

Furthermore, U.S. Pat. No. 4,404,007 proposes a method wherein a plurality of projections are irregularly arranged on the inner wall face of the cell to disturb the flow of the exhaust gas passing through the through-hole, thereby improving the purification performance of the exhaust gas, for example, the collection ratio of fine particles.

Moreover, European Patent Application laid open No. 191982A proposes a method wherein a fin is integrally united to the inner wall face of the partition to increase the surface area of the cell for improving the purification performance.

When the thickness of the partition wall is made thin over the whole thereof, however, there is a problem that as the thickness of the partition wall decreases, the partition wall is apt to be deformed during the shaping and the mechanical strength thereof lower.

In the method disclosed in U.S. Pat. No. 4,404,007, the surface area of the ceramic honeycomb structural body increases owing to the presence of the projections on the inner wall face of cell, but the disturbance of the passing gas undesirably occurs, thus considerably increasing the pressure loss.

In the method disclosed in European Patent Application laid open No. 191982A, the arrangement of the fin on the partition wall increases the surface area but brings about the increase of pressure loss as in the case of U.S. Pat. No. 4,404,007.

SUMMARY OF THE INVENTION

It is, therefore, an object of the invention to provide a ceramic honeycomb structural body having a large surface area and a small pressure loss, while maintaining good mechanical strength.

According to the invention, there is the provision of a ceramic honeycomb structural body having many through-holes surrounded by partition walls, characterized in that the thickness of said partition wall in at least a central portion of said structural body at a section perpendicular to said through-hole is thinned stepwise from a crossing segment of said partition wall up to a middle segment thereof.

BRIEF DESCRIPTION OF THE DRAWINGS

The invention will be described with reference to the accompanying drawings, wherein:

FIG. 1 is a perspective view of an embodiment of the ceramic honeycomb structural body according to the invention;

FIG. 2 is a partially enlarged schematic view of a cell in the ceramic honeycomb structural body of FIG. 1;

FIGS. 3a and 3b are partially enlarged schematic views of some modified embodiments of the cell, respectively;

FIGS. 4 and 5 are graphs showing test results of the ceramic honeycomb structural body according to the invention, respectively;

FIG. 6 is a partially enlarged schematic view of the other embodiment of the cell according to the invention; and FIG. 7 is a partially enlarged schematic view of the cell in the conventional ceramic honeycomb structural body.

DESCRIPTION OF THE PREFERRED EMBODIMENTS

Figure 5:
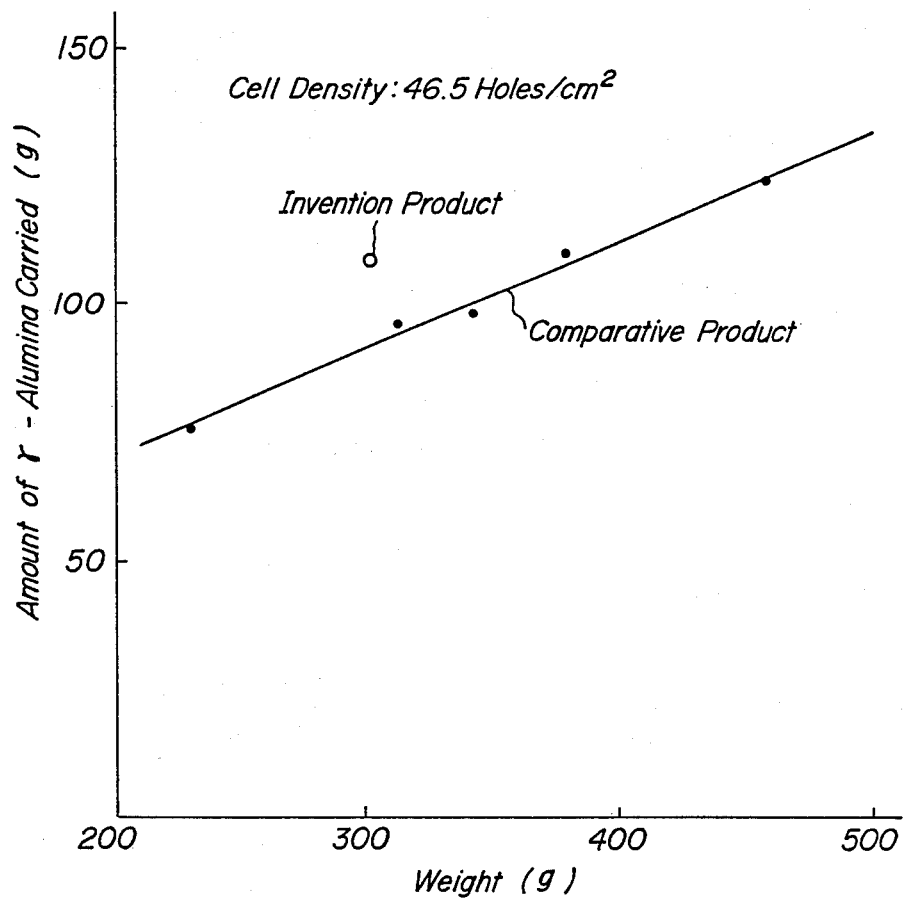

When the ceramic honeycomb structural body is used as a catalyst carrier, the purification performance is proportional to the surface area of the partition wall in communication with the passing gas, while the pressure loss is in inverse proportion to a hydraulic diameter corresponding to two times of a value obtained by dividing the sectional area of the cell by the peripheral length thereof (which is roughly estimated as a diameter of a circle inscribed with the opening of the cell) and an opening ratio obtained by dividing the total sectional area of the cells by the entire surface area of the ceramic honeycomb structural body. That is, the pressure loss becomes small as the values of the opening ratio and the hydraulic diameter become larger.

Considering the above influences on the purification performance and pressure loss, according to the invention, the thickness of the partition wall in the ceramic honeycomb structural body is thinned stepwise from the crossing segment of the partition wall to the middle segment thereof, whereby not only the surface area of the partition wall but also the opening area of the cell defined by the partition walls can be increased to make the hydraulic diameter and the opening ratio large.

Even when the thickness of the partition wall is thinned stepwise from the crossing segment to the middle segment, the mechanical strength still lowers, but since the thickness of the middle segment is thinned while maintaining the thickness of the crossing segment at a given value in the invention, the deformation of the partition wall is prevented during the shaping to prevent the lowering of the mechanical strengths. Furthermore, when the place for stepwise thinning the thickness of the partition wall is applied to only a region of partition walls in the vicinity of the central portion of the ceramic honeycomb structural body at a section perpendicular to the through-hole usually passing a large amount of the gas, the lowering of the mechanical strengths in the ceramic honeycomb structural body as a whole can further be prevented, whereby there can be obtained ceramic honeycomb structural bodies having larger surface areas and a smaller pressure losses.

Heretofore, the catalyst has been carried on the ceramic honeycomb structural body as follows. That is, the surface of the partition wall is coated with γ-alumina having a large specific surface area to increase the surface area in communication with the gas, and then a noble metal catalyst such as platinum, rhodium, palladium or the like is carried on the γ-alumina. The coating of γ-alumina is generally obtained by immersing the ceramic honeycomb structural body in an aqueous dispersion of γ-alumina, wherein the coating amount is proportional to the water absorption of the ceramic honeycomb structural body. Since the water absorption of the ceramic honeycomb structural body is proportional to the thickness of the partition wall when the structural bodies are made from the same ceramic material and have the same cell density, if it is intended to obtain a given amount of the coating layer on the uniformly thinner partition wall, it is undesirably required to raise the concentration of the dispersion or to increase the immersing repetitions. Particularly, when using the concentrated dispersion, an extra amount of γ-alumina can not be removed from the cells and consequently the clogging phenomenon occurs in the cell.

According to the invention, the thickness of the partition wall other than the crossing segment thereof is thinned with holding the crossing portion at the desired thickness, so that the water absorption of the ceramic honeycomb structural body is not so reduced and consequently the coating of γ-alumina is easy.

Furthermore, γ-alumina deposited on a corner between the crossing segments in the partition wall is a very coarse particle, so that the passing gas sufficiently penetrates into the inside of the coating layer. However, when this catalyst carrier is used over a long period of time, the degradation of the catalyst is vigorous near the surface of the coating layer and small in the inside thereof, so that it is desirable to make the thickness of the coating layer thick. In this connection, according to the invention, since the thickness of the partition wall is thinned stepwise from the crossing segment to the middle segment, γ-alumina is also deposited thickly on a corner portion between the crossing segment and the middle segment, whereby the amount of γ-alumina carried is increased to improve the purification performance and the durability performance.

Moreover, the ceramic material is easily supplied from the crossing segment having a thicker thickness of the partition wall toward the middle segment, so that the manufacture of the ceramic honeycomb structural body according to the invention is easy as compared with the conventional method of uniformly thinning the partition walls.

The invention will be described in detail with reference to the following example.

EXAMPLE

A cordierite material was extrusion-molded and fired to obtain a ceramic honeycomb structural body 1 having an outer diameter of 100 mm and an entire length of 100 mm and containing many through-holes 3 defined by plural partition walls 2 as shown in FIGS. 1 and 2.

In this product 1, the through-holes 3 were defined by the partition walls 2 of 0.2 mm in thickness at a cell density of 46.5 holes/cm$^2$. In the central portion 5 of the product 1 ranging from a center axis 4 with a radius of about 40 mm, the middle segment 7 existing between the crossing segments 6 of the partition wall 2 has a width of 0.7 mm and a thickness of 0.13 mm (see FIG. 2).

Further, two ceramic honeycomb structural bodies 2 and 3 were produced by the same method as described in the product 1. In this case, the product 2 had a partition wall thickness of 0.17 mm, a cell density of 62 holes/cm$^2$, a middle segment width of 0.5 mm and a middle segment thickness of 0.13 mm, while the product 3 had a partition wall thickness of 0.3 mm, a cell density of 31 holes/cm$^2$, a middle segment width of 1 mm and a middle segment thickness of 0.17 mm.

In Comparative Examples 1 to 5, the same procedure as described above was repeated to obtain a ceramic honeycomb structural body having a uniform partition wall thickness of 0.15 mm, 0.18 mm, 0.2 mm, 0.22 mm and 0.27 mm and a cell density of 46.5 holes/cm$^2$ as shown in FIG. 7.

In Comparative Example 6, the ceramic honeycomb structural body had a partition wall thickness of 0.17 mm and a cell density of 62 holes/cm$^2$, while in Comparative Example 7, the ceramic honeycomb structural body had a partition wall thickness of 0.3 mm and a cell density of 31 holes/cm$^2$.

With respect to these ceramic honeycomb structural bodies, the isostatic strength, as a mechanical strength and the pressure loss were measured to obtain results as shown in the following Table 1 and FIG. 4. The isostatic strength was evaluated by fitting aluminum plates of about 20 mm in thickness to upper and lower end faces of the ceramic honeycomb structural body through a urethane sheet of about 0.5 mm in thickness, and air-tightly enclosing the side face of the structural body with a urethane tube of about 0.5 mm in thickness, and placing it in a pressure vessel filled with water, and gradually raising a pressure inside the vessel to measure a pressure value producing the destructive sound. The pressure loss was evaluated by placing the ceramic honeycomb structural body in a vessel, and flowing air at room temperature into the inside thereof at a rate of 4 m$^3$/min to measure a pressure difference between the upper and lower faces of the structural body.

TABLE 1

| | Cell density (holes/cm$^2$) | Partition wall thickness (mm) | Geometric surface area (cm$^2$/cm$^3$) | Weight (g) | Isostactic strength (kg/cm$^2$) | Pressure loss (mm H$_2$O) | Amount of γ-alumina carried (g) |
|---|---|---|---|---|---|---|---|
| Product 1 | 46.5 | 0.20/0.13 | 24.4 | 303 | 45 | 72 | 109 |
| Comparative product 1 | | 0.15 | 24.5 | 231 | 3 | 74 | 76 |
| Comparative product 2 | | 0.18 | 23.9 | 314 | 22 | 77 | 96 |
| Comparative product 3 | | 0.20 | 23.6 | 343 | 42 | 78 | 98 |
| Comparative | | 0.22 | 23.2 | 380 | 87 | 83 | 110 |

TABLE 1-continued

| | Cell density (holes/cm²) | Partition wall thickness (mm) | Geometric surface area (cm²/cm³) | Weight (g) | Isostactic strength (kg/cm²) | Pressure loss (mm H₂O) | Amount of γ-alumina carried (g) |
|---|---|---|---|---|---|---|---|
| product 4 | | | | | | | |
| Comparative product 5 | | 0.27 | 22.3 | 459 | 142 | 94 | 124 |
| Product 2 | 62.0 | 0.17/0.13 | 27.9 | 316 | 26 | 92 | 115 |
| Comparative product 6 | | 0.17 | 27.3 | 338 | 24 | 97 | 107 |
| Product 3 | 31.0 | 0.30/0.17 | 19.6 | 333 | 38 | 64 | 103 |
| Comparative product 7 | | 0.30 | 18.6 | 400 | 39 | 70 | 87 |

As seen from Table 1, the product 1 has geometric surface area and pressure loss equal to those of the comparative product 1 having a thin partition wall thickness, and the mechanical strength thereof is equal to that of the comparative product 3 having a slightly thicker partition wall thickness.

When the products 1 to 3 are compared with the comparative product having the same partition wall thickness, the mechanical strength is the same, but the geometrical surface area increases and the pressure loss decreases. That is, it has been confirmed that according to the invention, the performances on the geometrical surface area and pressure loss in the ceramic honeycomb structural body are improved with holding the predetermined mechanical strength. As shown in FIG. 4, in the ceramic honeycomb structural bodies having the same partition wall thickness and a cell density of 46.5 holes/cm², the mechanical strength is the same, but the pressure loss is lower by about 10% than that of the comparative product.

Then, the weights before and after the coating were measured by immersing the ceramic honeycomb structural body in a sufficintly agitated aqueous dispersion of γ-alumina and a small amount of a binder, removing it therefrom, removing an extra amount of the dispersion, and drying and firing the structural body. That is, the amount of γ-alumina carried was calculated by subtracting the weight of the ceramic honeycomb structural body having a cell density of 46.5 holes/cm² before the coating from the weight after the coating to obtain a result as shown in Table 1 and FIG. 5. As seen from Table 1 and FIG. 5, the amount of γ-alumina carried in the product according to the invention is larger by about 7~18% than that of the comparative product having the same partition wall thickness.

Although the invention has been described with respect to the above illustrated embodiment, it may be subjected to various modifications and changes without departing from the scope of the invention. For example, the cell form of the illustrated embodiment is square, but it may be triangular or hexagonal shown in FIGS. 3a or 3b. As the ceramic material, other ceramic materials may be used in addition to the cordierite. As shown in FIG. 6, the partition wall thickness may be thinned at two steps from the crossing segment toward the middle segment, or it is possible to change the partition wall thickness in three or more steps.

As mentioned above, according to the invention, the thickness of the partition wall in the ceramic honeycomb structural body is thinned stepwise from the crossing segment of the partition wall to the middle segment thereof, so that the geometric surface area per volume increases and also the hydraulic diameter and opening ratio increase, thereby improving the purification performance and reducing the pressure loss while sufficiently maintaining a given mechanical strength, additionally the production of the honeycomb structural body can also be performed easily.

What is claimed is:

1. A ceramic honeycomb structual body comprising:
   a plurality of longitudinal partition walls extending along a length of said ceramic honeycomb structural body; and
   a plurality of cells longitudinally extending along a length of said ceramic honeycomb structural body, said cells being defined by intersecting longitudinal partition walls;
   wherein at least the partition walls located at a central portion of said ceramic honeycomb structural body each have a thickness which is decreased in a stepwise manner from intersecting portions of said partition wall to a middle portion thereof.

2. A ceramic honeycomb structural body according to claim 1, wherein said stepwise manner includes two steps.

3. A ceramic honeycomb structural body according to claim 1, wherein said stepwise manner includes three steps.

4. A ceramic honeycomb structural body according to claim 1, wherein said stepwise manner includes four steps.

5. A ceramic honeycomb structural body according to claim 1, wherein said cells have a cross-sectional geometric configuration substantially corresponding to a square.

6. A ceramic honeycomb structural body according to claim 1, wherein said cells have a cross-sectional geometric configuration substantially corresponding to a triangle.

7. A ceramic structural body according to claim 1, wherein said cells have a cross-sectional geometric configuration substantially corresponding to a hexagon.

8. A ceramic honeycomb structural body according to claim 1, wherein said body comprises cordierite.

9. A ceramic honeycomb structural body according to claim 1, wherein said body is an extrusion molded body.

* * * * *